S. MART & C. W. BRADLEY.
Apparatus for Heating or Cooling Water.
No. 224,198.  Patented Feb. 3, 1880.
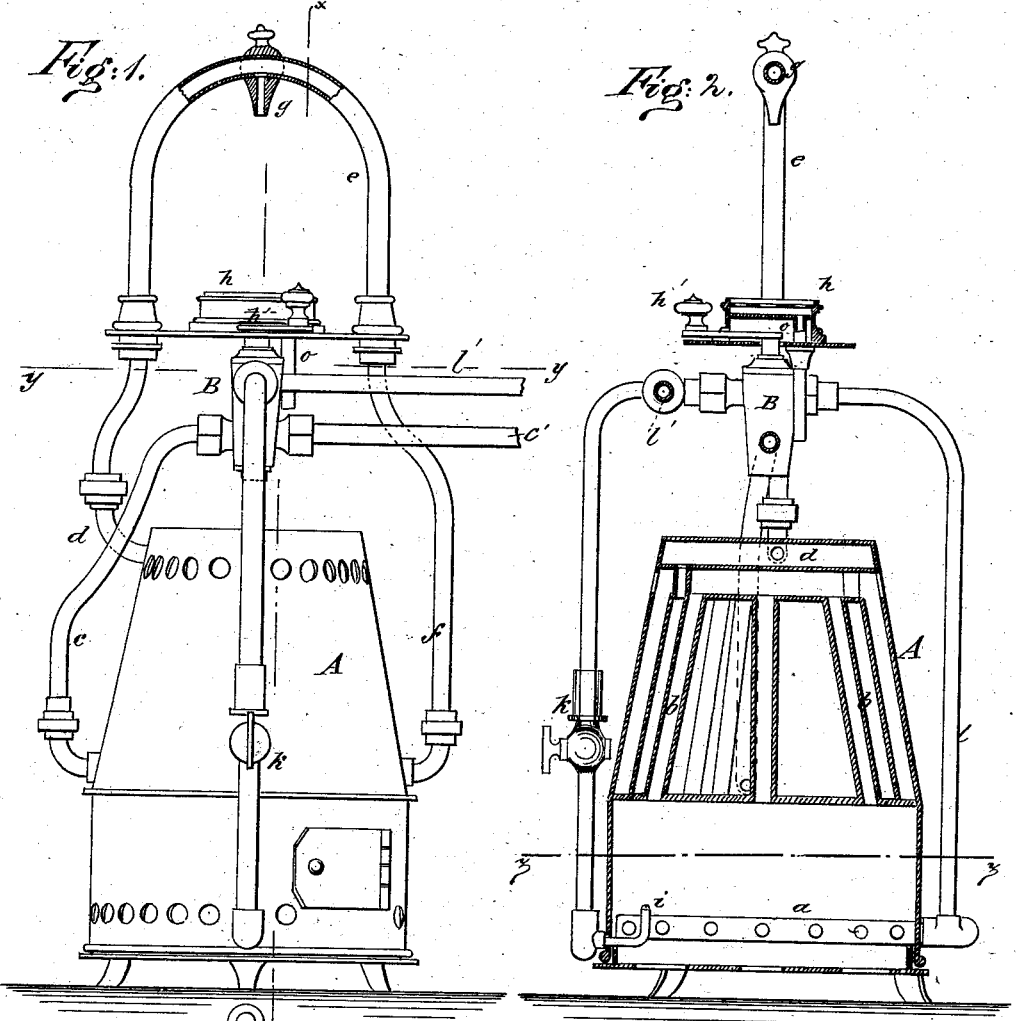
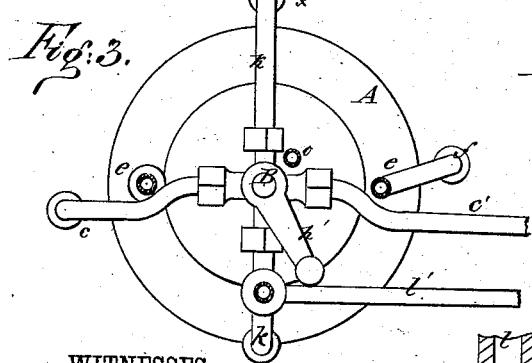
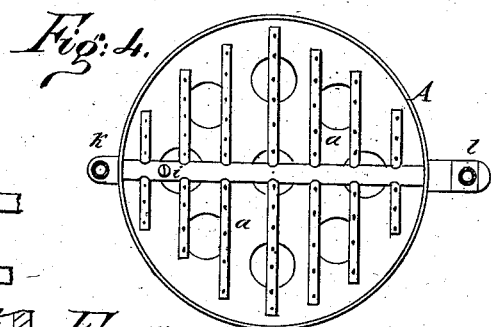
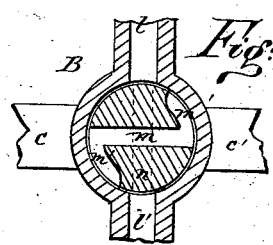
WITNESSES:
INVENTOR:
S. Mart
C. W. Bradley
BY Munn & Co
ATTORNEYS.

UNITED STATES PATENT OFFICE.

SAMUEL MART, OF SUTTON-AT-HONE, COUNTY OF KENT, AND CHARLES W. BRADLEY, OF YORK STREET, COUNTY OF SURREY, ENGLAND.

APPARATUS FOR HEATING OR COOLING WATER.

SPECIFICATION forming part of Letters Patent No. 224,198, dated February 3, 1880.

Application filed September 30, 1879.

*To all whom it may concern:*

Be it known that we, SAMUEL MART, of Sutton-at-Hone, in the county of Kent, and CHARLES WALLACE BRADLEY, of York Street, in the county of Surrey, England, have invented a new and Improved Apparatus for Heating or Cooling Water and other Liquids, and for conveying and delivering the same, of which the following is a specification.

Our improvements relate to apparatus for heating or cooling water and other liquids wherein the water is circulated in tubes within a heating or cooling space and drawn through a pipe as desired for use.

In heating water we make use of gas-burners to which the gas is turned on when required by a cock, which also supplies gas to a pilot-burner that burns continuously to maintain the heat and keep up a circulation. We combine the gas-cock with the water-supply pipe in such a manner that a single handle is made use of for regulating the gas-supply, the supply of water to the boilers, and the delivery of the hot water. The hot water is delivered by a rising pipe above the heater, into which the hot water is forced by the pressure when the water-inlet to the heater is opened. In cooling water, ice is substituted for the burners.

The construction and operation will be more particularly explained with reference to the accompanying drawings, and the invention pointed out in the claims.

In the drawings, Figure 1 is a front elevation of our improved heating apparatus. Fig. 2 is a vertical section of the same on line $x\,x$ of Fig. 1. Fig. 3 is a horizontal section on line $y\,y$ of Fig. 1. Fig. 4 is a horizontal section on line $z\,z$ of Fig. 2. Fig. 5 is a horizontal section, showing the construction of the cock and its connections.

Similar letters of reference indicate corresponding parts.

A is the case of the heater or cooler, which is shown as made in portable form, and is fitted in the lower part of the casing with the perforated pipes $a$, forming a gas-burner, to which air is admitted by suitable openings. The heater is made of metal, with tubes $b$ running through the water-space for the heated air and gases to pass through. These tubes may be round, square, or polygonal, and either straight or tapered, and are placed in the vessel as close together as may be, in order to present the largest amount of heating-surface to the quantity of water passing through.

$c$ is the inlet for cold water; $d$, the outlet for water as heated; $e$, arched pipe or tube, connected with $d$ at one end, through which the heated water flows to the delivery-outlet $g$, which is at the highest part of pipe $e$; $f$, pipe connected to tube $e$, for carrying the water back to the boiler. $h$ is a table or stand fixed beneath the arched pipe $e$, and furnished with grating, on which, when the heated water is required, the glass or other receptacle is placed. $h'$ is a lever or handle connected with the stem of a four-way cock, B, for actuating the same; or the stand $h$ may be connected to the stem of the cock and turn with the lever. The four-way cock B governs the supply of gas and water or other liquid, as described hereinafter.

$k$ is a pipe conveying gas to a small pilot-burner, $i$, which is kept burning under the heater or boiler. $l$ is the main pipe for supply of gas to the burners $a$.

The four-way cock B, as shown in Fig. 5, is in connection with the boiler-supply pipe $c$ and the pipe $c'$ for supplying water under pressure, and also in connection with the gas-pipe $l$ to the burners $a$ and supply gas-pipe $l'$. The plug of the cock is formed with the passages $m\,m'$, for connecting the gas-pipes $l\,l'$, and a passage, $n$, (shown in dotted lines,) for connecting the water-pipes $c\,c'$, these passages being arranged in such a manner that when the plug is partly turned the gas is admitted to the main burners, and when further turned the water-pipes are connected.

In use the water contained in the boiler is kept heated by the pilot-burner $i$, which is supplied by an independent connection with pipe $l'$, and the steam may escape by the opening $g$. When a supply of hot water is desired the glass or receptacle is to be placed on the stand $h$, and the lever $h'$ then partly moved, which action brings the passages $m\,m'$ of the cock in position for supplying gas to the burners, where the gas is ignited by the pilot-burner, and the heat thus generated rapidly heats the water in the boiler. To deliver the heated water, the handle $h'$ will be further turned, which brings the passage $n$ in position for admitting cold water by the pipe $c$ to the boiler. The pressure thus created causes the hot water to issue at the opening $g$ into the receptacle on the stand $h$, and when a sufficient quantity is drawn the handle or lever $h'$ is to be turned back to cut off the supply of cold water and gas, leaving only the pilot-light burning.

The stand $h$ may be fitted with a hollow plug or cock to carry off the surplus water; but we prefer to use the pipe $o$, opening at the bottom of said table, and through which the surplus water is conveyed away as desired.

The construction of the delivery-pipe $e$ may be somewhat modified, if desired. Instead of having an arched pipe, a single pipe may be used, curved downward at the upper end for outlet of water, and inclosing the upper ends of the circulation-pipes $d\,f$, which connect together at that end, and have also an opening to the outlet, so that when the cock B is closed the water may rise in pipe $d$, and return to the boiler by pipe $f$, and when cock B is opened the hot water will rise to the outlet.

By having the outlet at the highest part of the arched tube the circulation of the water is not interfered with, as would be the case if the outlet were at the bottom or under side.

For cooling water and delivering it cooled we prefer to arrange within a chamber in the casing a coil of pipe, connected in the manner described with the supply and outlet pipes. The chamber is to be filled with powdered or lump ice around the coil, and the water passing through the coil becomes cooled, and is delivered as cooled by the means described. The chamber containing the coil will be preferably covered with felt and have a perforated bottom, on which the ice is to be placed, so that the water may escape to a chamber beneath, from whence it will be drawn off by a pipe and cock.

For heating water for baths the arrangements will be similar to those shown, except that the table will not be required, and the lever on being turned to admit gas will allow the water to flow to the boiler, and being further turned admits the hot water to the bath-tub.

Having thus described our invention, we claim as new and desire to secure by Letters Patent—

1. The combined apparatus for heating or cooling water or other liquid and delivering the same, consisting of the case A, formed with a water space and tubes, the inlet-pipe $c$, circulation-pipes $d\,f$, outlet-pipe $e$, and cock B, substantially as described and shown.

2. The improved apparatus for heating water and delivering the same, consisting of the case A, containing the water-space and the tubular flues, the water-supply pipe $c$, circulation-pipes $d\,f$, and delivery-pipe $e$, the gas-burners $a$, and gas-supply pipe $k$, pilot-burner $i$, and pipe $l$, and four-way cock B, connected in the water and gas supply tubes, all combined and arranged substantially as and for the purposes specified.

3. The table $h$, furnished with grating, arranged beneath arched pipe $e$, and provided with a handle, $h'$, connected with cock B, as and for the purpose described.

4. In a heater, the arched pipe $e$, having delivery-outlet $g$ at its highest point, connected at one end with hot-water pipe $d$, and attached at the other end to the boiler-pipe $f$, as and for the purpose specified.

5. In apparatus for heating or cooling water or other liquids, the four-way cock B, formed with the passages $m$, $m'$, and $n$, in combination with the water and gas supply pipes, substantially as and for the purposes specified.

The above specification signed by us this 30th day of June, 1879.

SAML. MART. [L. S.]
CHAS. W. BRADLEY. [L. S.]

Witnesses:
WM. STUART,
   2 *Boyton Road, London.*
T. MORGAN,
   21 *Cockspur Street, London S. W.*